| (12) | United States Patent | (10) Patent No.: | US 9,084,928 B2 |
|---|---|---|---|
| | Klang | (45) Date of Patent: | Jul. 21, 2015 |

(54) TONG OPERATING DEVICE FOR A PINSETTER

(71) Applicant: Sven Gunnar Klang, Port Saint Lucie, FL (US)

(72) Inventor: Sven Gunnar Klang, Port Saint Lucie, FL (US)

( * ) Notice: Subject to any disclaimer, the term of this patent is extended or adjusted under 35 U.S.C. 154(b) by 36 days.

(21) Appl. No.: 13/956,011

(22) Filed: Jul. 31, 2013

(65) Prior Publication Data

US 2015/0035303 A1      Feb. 5, 2015

(51) Int. Cl.
*B25J 15/00*      (2006.01)
*A63D 5/08*      (2006.01)

(52) U.S. Cl.
CPC .............. *A63D 5/08* (2013.01); *B25J 15/0028* (2013.01)

(58) Field of Classification Search
CPC .. B25J 15/0213; B25J 15/026; B25J 15/0028; B25J 15/08; E21B 19/06; A63D 5/08
USPC ................ 294/199, 106, 87.1; 473/73–91, 57
See application file for complete search history.

(56) References Cited

U.S. PATENT DOCUMENTS

| 2,307,839 | A | * | 1/1943 | Kaufman | 473/84 |
| 3,097,875 | A | * | 7/1963 | Kaplan | 294/67.31 |
| 3,809,398 | A | * | 5/1974 | Schmid et al. | 473/87 |
| 5,393,269 | A | * | 2/1995 | Atkinson, Jr. | 473/73 |
| 6,358,155 | B1 | * | 3/2002 | Huhne | 473/73 |
| 6,524,192 | B1 | * | 2/2003 | Tsujita et al. | 473/73 |
| 2008/0036229 | A1 | * | 2/2008 | Oliason | 294/106 |
| 2010/0032973 | A1 | * | 2/2010 | Ramun | 294/88 |

FOREIGN PATENT DOCUMENTS

WO      WO 2014002651 A1 *   1/2014   ............... E02F 3/40

* cited by examiner

*Primary Examiner* — Saul Rodriguez
*Assistant Examiner* — Gabriela Puig

(57) ABSTRACT

An improvement for a bowling pinsetting machine. The bowling pinsetting machine of the present invention includes a tong operating device with an upper tong and a lower tong. The upper tong and the lower tong may be connected to an actuation gear which may drive the tongs together and apart. The tong operating device may be substantially made of plastic. At least one of the upper tong, the lower tong, and the actuation gear may include metal oil-filled bearings. At least one metal pin may run through the metal oil-filled bearing and thereby connect the upper tong, the lower tong and the actuation gear.

10 Claims, 4 Drawing Sheets

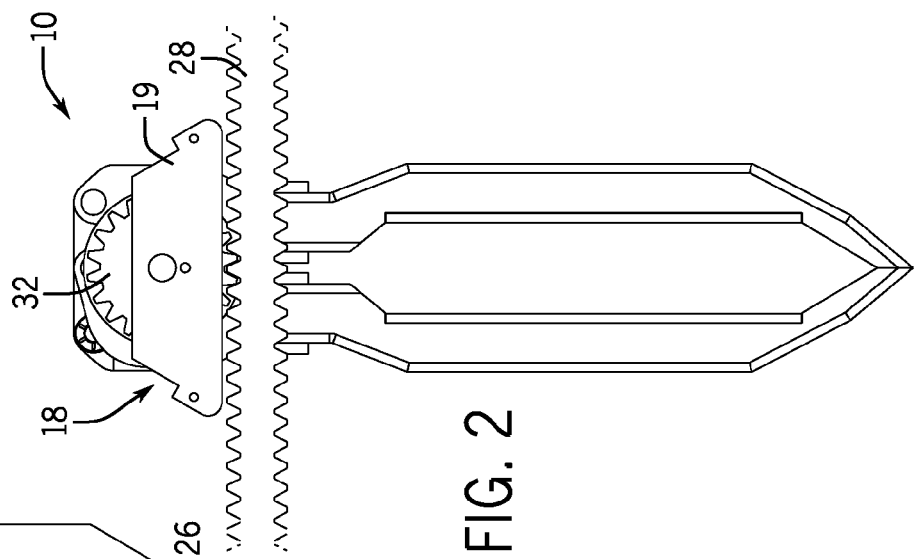
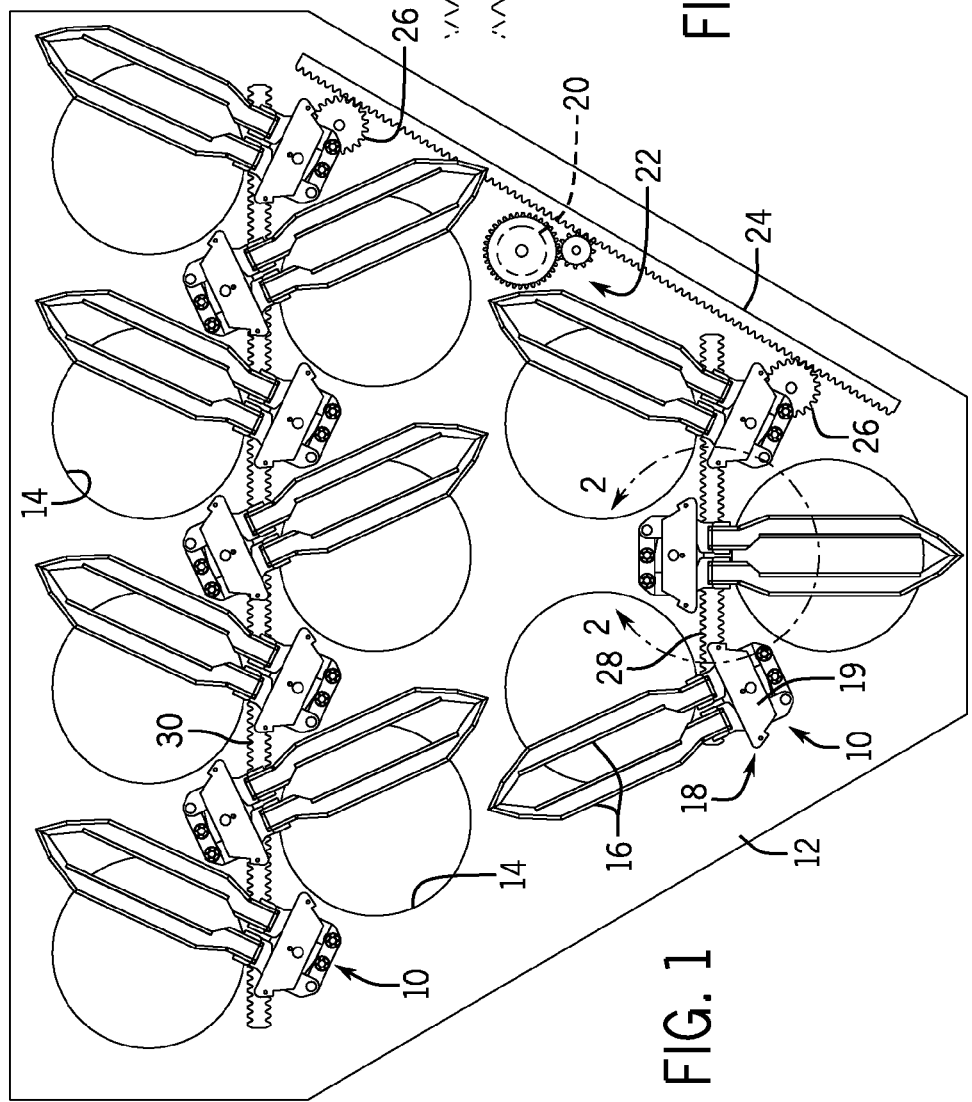

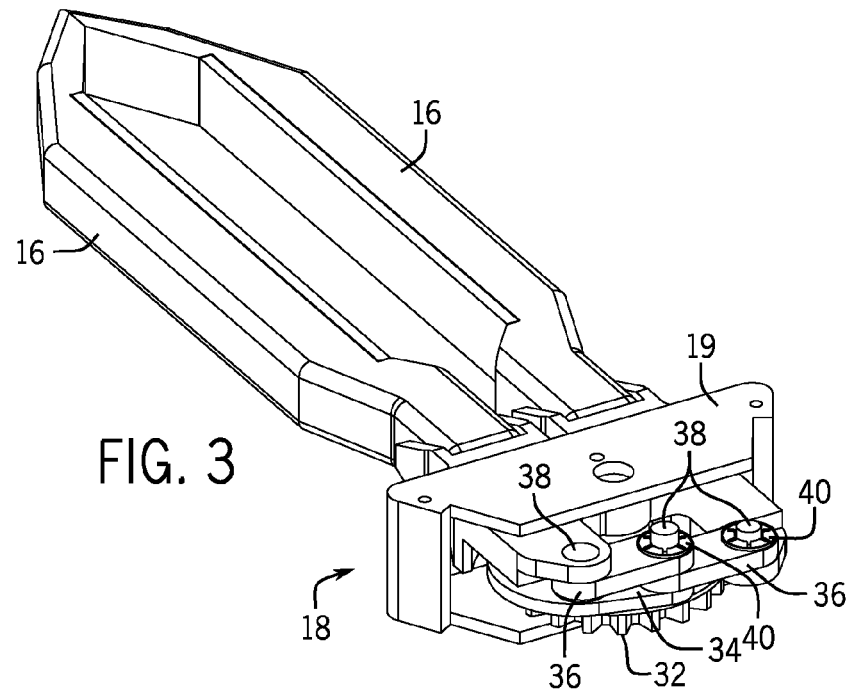
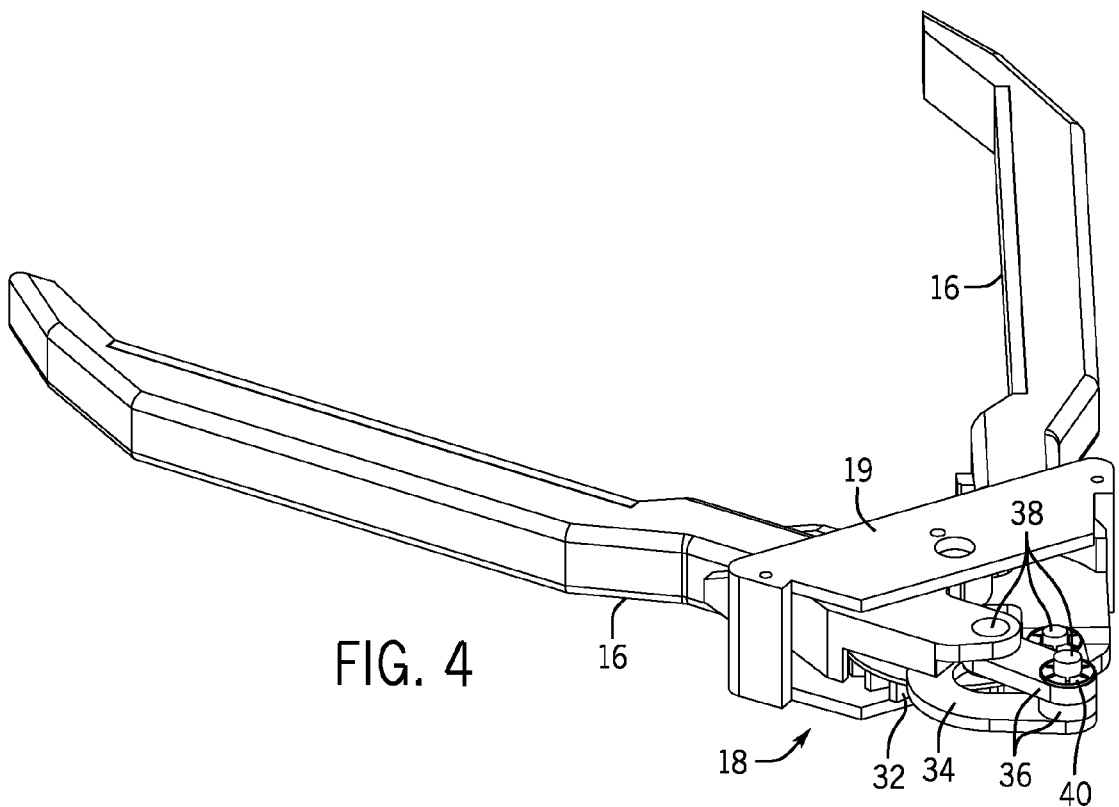

TONG OPERATING DEVICE FOR A PINSETTER

BACKGROUND OF THE INVENTION

The present invention relates to a tong operating device and, more particularly, to a plastic tong operating device with metal pins and metal oil-filled bearings.

Pinsetters are mechanical devices that remove and reset pins at a bowling alley. Currently, the Brunswick GSX® Pinsetter is equipped with ten tongs to lift standing pins. The tongs are made of plastic and therefore only last for about two to three years due to wear of the plastic. In particular, links of the tongs wear out since the links are made of plastic as well.

As can be seen, there is a need for a pinsetter that is inexpensive and has a long lifetime.

SUMMARY OF THE INVENTION

In one aspect of the present invention, a tong device mounted to a pinsetting machine comprises: an upper tong mounting comprising a polymer; a lower tong mounting comprising a polymer; an actuation gear operatively connected to the upper tong mounting and the lower tong mounting, wherein at least one of the upper tong mounting, the lower tong mounting, and the actuation gear comprise a metal oil bearing, wherein the upper tong mounting, the lower tong mounting, and the actuation gear are rotatably connected together by at least one metal pin that runs through the metal oil bearing.

In another aspect of the present invention, the tong device of claim 1 further comprises: a crank arm, a first link, and a second link wherein the crank arm, the first link and the second link comprise a plurality of metal oil bearings, wherein the crank arm is rotatably connected to the actuation gear by at least one metal pin running through a metal oil bearing of the crank arm, wherein the crank arm is rotatably connected to the first link and the second link by at least one metal pin running through a metal oil bearing of the crank arm, a metal oil bearing of the first link, and a metal bearing of the second link, wherein the first link is rotatably connected to the upper tong mounting by at least one metal pin running through a metal oil bearing of the first link; wherein the second link is rotatably connected to the lower tong mounting by at least one metal pin running through a metal oil bearing of the second link.

These and other features, aspects and advantages of the present invention will become better understood with reference to the following drawings, description and claims.

BRIEF DESCRIPTION OF THE DRAWINGS

FIG. 1 is a top plan view of the present invention in use;

FIG. 2 is a bottom plan view of the present invention;

FIG. 3 is a perspective view of the present invention with the tongs in a closed position;

FIG. 4 is a perspective view of the present invention with the tongs in an open position;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an improvement for a bowling pinsetting machine. The bowling pinsetting machine of the present invention includes a tong operating device with an upper tong and a lower tong. The upper tong and the lower tong may be connected to an actuation gear which may drive the tongs together and apart. The tong operating device may be substantially made of plastic. At least one of the upper tong, the lower tong, and the actuation gear may include metal oil-filled bearings. At least one metal pin may run through the metal oil-filled bearing and thereby connect the upper tong, the lower tong and the actuation gear.

The present invention may include the tongs of the current pinsetters with molded oiled bearings and pins that are made of metal, such as steel. The metal pins and oiled bearings may increase the life of the tongs with the proper lubrication, while still being relatively inexpensive, since the tongs themselves may be made of plastic.

Figure 5:
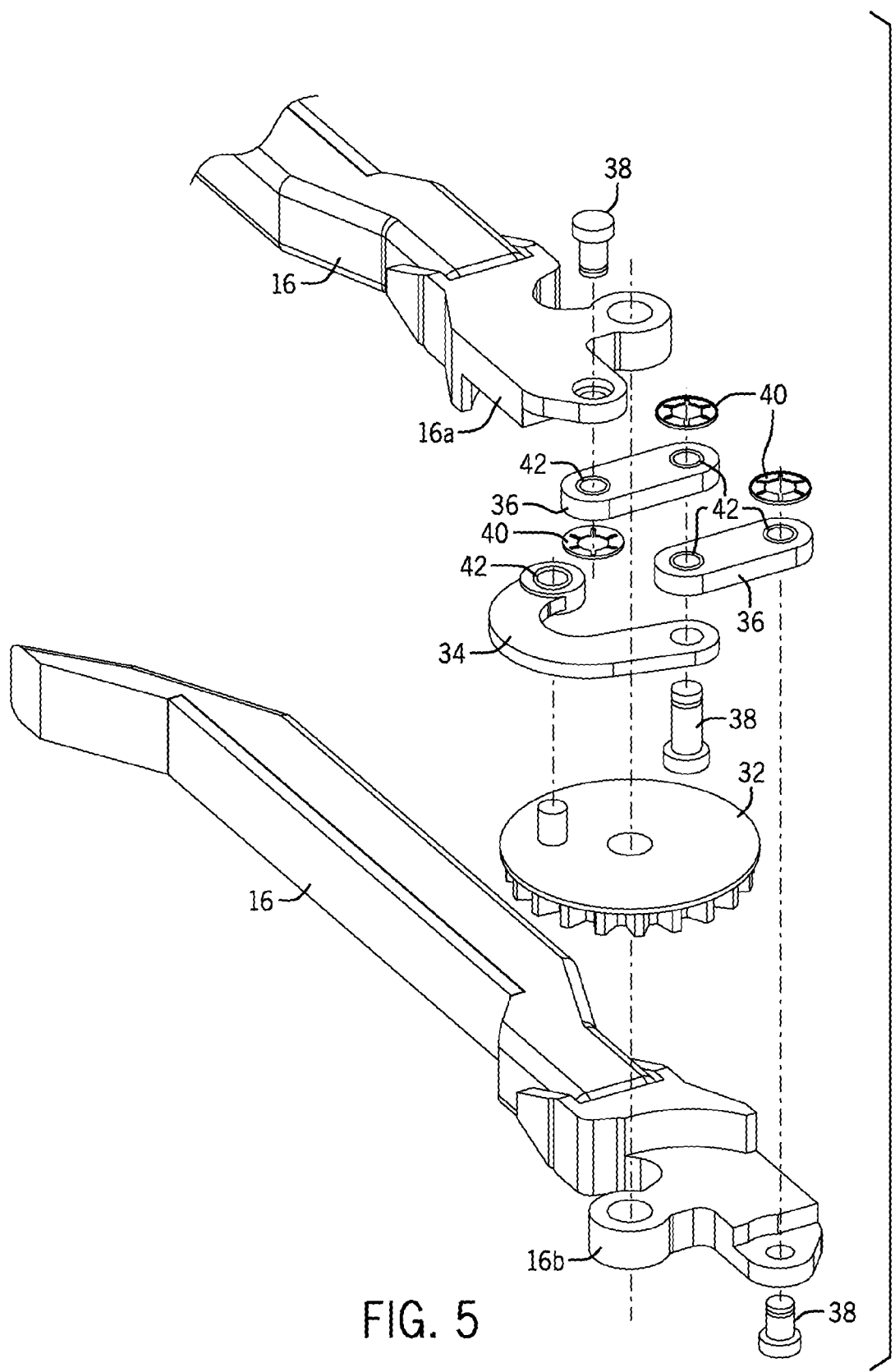
FIG. 5 is an exploded perspective view.
Figure 6:
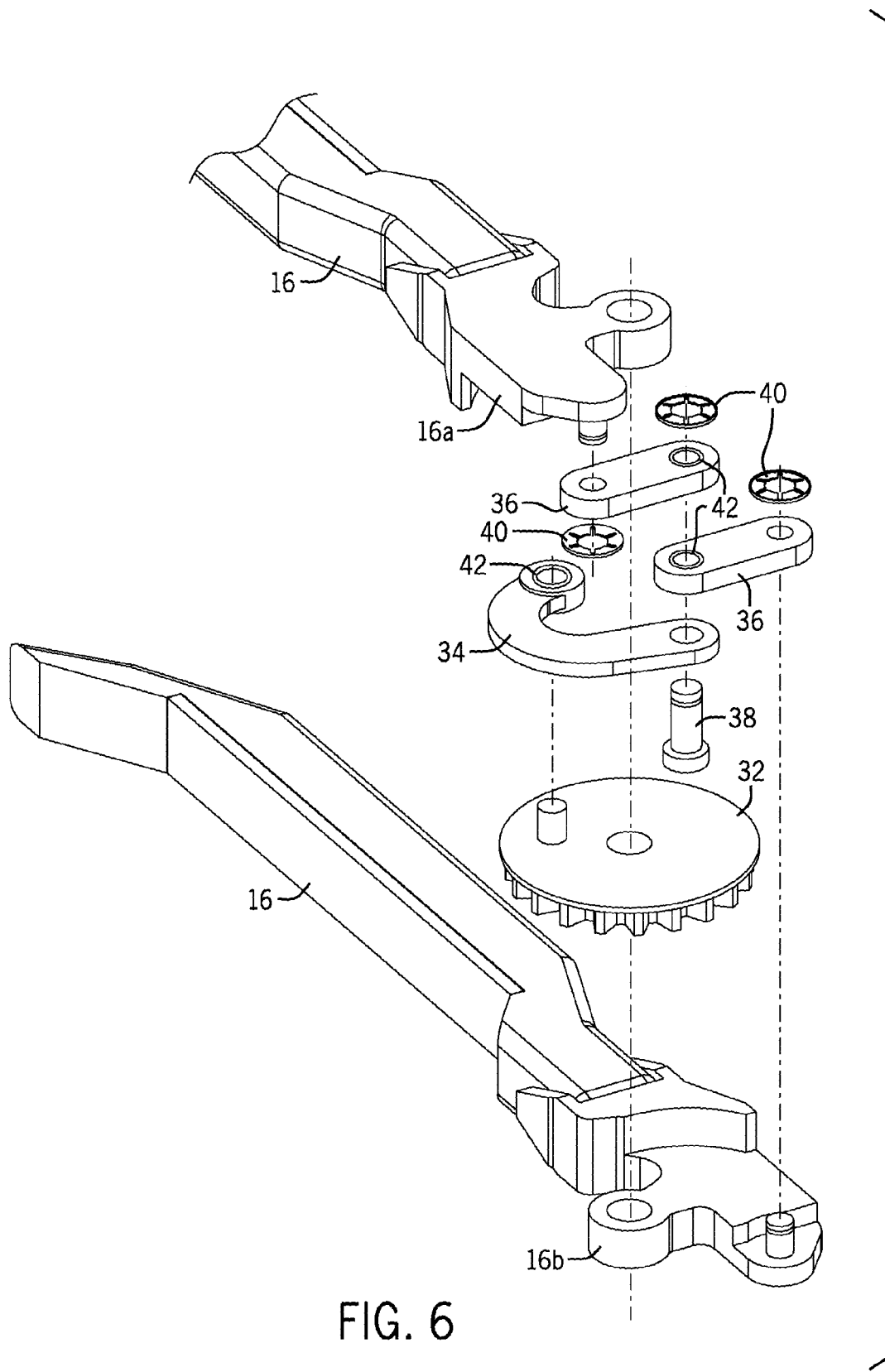
FIG. 6 is an exploded perspective view of an alternate embodiment.

Referring to FIGS. 1 through 6, the present invention may be used with a pinsetting machine 10. The pinsetting machine 10 may include a setting table 12 to gather the standing pins. The setting table 12 may include clearance holes 14 for the bowling pins to fit through. The setting table 12 may further include a main track 24 in which a motor 20 and a gear 22 are operatively connected. The setting table 12 may further include a front actuation rack 28 and a rear actuation rack 30. The main track 24 may be connected to the front actuation rack 28 and the rear action rack 30 by a plurality of pinion gears 26. The tongs 16 may be connected to the front actuation rack 28 and the rear actuation rack 30. Therefore, the motor 20 may operate the tongs 16.

The tongs 16 of the present invention may include an upper tong mounting 16a and a lower tong mounting 16b. The upper tong mounting 16a and the lower tong mounting 16b may be connected at an actuation unit 18 which may be supported by a frame 19. The actuation unit 18 may include a first link 36, a second link 36, a crank arm 34, a plurality of retaining rings 40, a plurality of metal pins 38, and a plurality of metal oil-filled bearings 42. The entire tongs 16 and the actuation unit 18 may be made of a polymer such as plastic, while the plurality of metal pins 38 and the plurality of metal oil-filled bearings 42 are made of a metal, such as steel.

In certain embodiments, the upper tong mounting 16a, may include a first opening. The first link may include a first opening and a second opening. The first opening of the upper tong mounting 16a and the first opening of the first link 36 may align and a metal pin 38 may run through the openings and thereby rotatably connect them. The second link 36 may further include a first opening and a second opening. The crank arm 34 may include a first opening and a second opening. The second opening of the first link 36 may align with the first opening of the second link 36, which may align with the first opening of the crank arm 34. A metal pin 38 may run through the second opening of the first link 36, the first opening of the second link 36, and the first opening of the crank arm 34, thereby rotatably connecting them. In certain embodiments, the lower tong mounting 16b may include a first opening. The first opening of the lower tong mounting 16b may align with the second opening of the second link 36. A metal pin 38 may run through the first opening of the lower tong mounting 16b and the second opening of the second link 36, and thereby rotatably connect them.

Alternatively, instead of the upper tong mounting 16a and the lower tong mounting 16b having a first opening, the metal pin 38 may be embedded in the polymer of the tongs 16. Therefore, the metal pin 38 of the upper tong mounting 16a may connect with the first link 36, and the metal pin 38 of the lower tong mounting 16b may connect with the second link 36.

The upper tong mounting 16a and the lower tong mounting 16b may further include a second opening. The actuation unit 18 for the tongs 16 may further include a driven actuation gear 32, with a pin on the surface and an opening in the center. The second opening of the upper tong mounting 16a, the second opening of the lower tong mounting 16b, and the center opening of the actuation gear 32 may align, with the actuation gear 32 being oriented in between the tong mountings 16a, 16b. A metal pin 38 may run through the openings and thereby rotatably connect them. The second opening of the crank arm 34, may fit over the pin of the actuation gear 32. Therefore, when the actuation gear 32 is actuated by the motor 20, the tongs may open and close accordingly. A plurality of retaining rings 40 may be used to secure the metal pins 38 in place.

The openings mentioned above may include oil-filled bearings 42. Therefore, both of the pins 38 and the oil-filled bearings 42 may be made of metal, while the other parts of the tongs 16 may be made of plastic. The tongs 16 of the present invention may be molded so that the pins 38 and/or oil-filled bearings 42 are embedded within the pinsetting machine 10. With the embedded metal pins 38 and oil-filled bearings 42, the life of thongs 16 may be drastically increased.

It should be understood, of course, that the foregoing relates to exemplary embodiments of the invention and that modifications may be made without departing from the spirit and scope of the invention as set forth in the following claims.

What is claimed is:

1. A tong device mounted to a pinsetting machine comprising:
    an upper tong mounting comprising a polymer;
    a lower tong mounting comprising a polymer;
    an actuation gear operatively connected to the upper tong mounting and the lower tong mounting; and
    at least one metal oil bearing molded and thereby embedded within a polymer portion of the tong device,
    wherein the upper tong mounting, the lower tong mounting, and the actuation gear are rotatably connected together by at least one metal pin that runs through the at least one metal oil bearing.

2. The tong device of claim 1, wherein the polymer is plastic.

3. The tong device of claim 2, wherein the upper tong mounting and the lower tong mounting are plastic.

4. The tong device of claim 1, wherein the metal is steel.

5. The tong device of claim 1 further comprising:
    a crank arm, a first link, and a second link wherein the crank arm, the first link and the second link comprise a plurality of metal oil bearings,
    wherein the crank arm is rotatably connected to the actuation gear by at least one metal pin running through a metal oil bearing of the crank arm,
    wherein the crank arm is rotatably connected to the first link and the second link by at least one metal pin running through a metal oil bearing of the crank arm, a metal oil bearing of the first link, and a metal bearing of the second link,
    wherein the first link is rotatably connected to the upper tong mounting by at least one metal pin running through a metal oil bearing of the first link;
    wherein the second link is rotatably connected to the lower tong mounting by at least one metal pin running through a metal oil bearing of the second link.

6. The tong device of claim 5, wherein the at least one metal pin connecting the first link and the upper tong is embedded in the polymer of the upper tong.

7. The tong device of claim 5, wherein the at least one metal pin connecting the second link and the lower tong is embedded in the polymer of the lower tong.

8. A tong device mounted to a pinsetting machine comprising:
    an upper tong mounting comprising a polymer;
    a lower tong mounting comprising a polymer;
    an actuation gear operatively connected to the upper tong mounting and the lower tong mounting;
    wherein at least one of the upper tong mounting, the lower tong mounting, and the actuation gear comprise a metal oil bearing,
    wherein the upper tong mounting, the lower tong mounting, and the actuation gear are rotatably connected together by at least one metal pin that runs through the metal oil bearing; and
    a crank arm, a first link, and a second link wherein the crank arm, the first link and the second link comprise a plurality of metal oil bearings,
    wherein the crank arm is rotatably connected to the actuation gear by at least one metal pin running through a metal oil bearing of the crank arm,
    wherein the crank arm is rotatably connected to the first link and the second link by at least one metal pin running through a metal oil bearing of the crank arm, a metal oil bearing of the first link, and a metal bearing of the second link,
    wherein the first link is rotatably connected to the upper tong mounting by at least one metal pin running through a metal oil bearing of the first link;
    wherein the second link is rotatably connected to the lower tong mounting by at least one metal pin running through a metal oil bearing of the second link.

9. The tong device of claim 8, wherein the at least one metal pin connecting the first link and the upper tong is embedded in the polymer of the upper tong.

10. The tong device of claim 8, wherein the at least one metal pin connecting the second link and the lower tong is embedded in the polymer of the lower tong.

* * * * *